United States Patent
Zhu et al.

(10) Patent No.: US 11,973,868 B2
(45) Date of Patent: Apr. 30, 2024

(54) SYSTEMS AND METHODS FOR A FAST NEAR-FIELD ELECTROMAGNETIC SIMULATION METHODOLOGY FOR SIDE-CHANNEL EMISSION ANALYSIS

(71) Applicant: ANSYS, INC., Canonsburg, PA (US)

(72) Inventors: Deqi Zhu, San Jose, CA (US); Norman Chang, Fremont, CA (US); Lang Lin, Cupertino, CA (US); Dinesh Kumar Selvakumaran, Pflugerville, TX (US); Yu Lu, San Ramon, CA (US)

(73) Assignee: ANSYS, INC., Canonsburg, PA (US)

( * ) Notice: Subject to any disclaimer, the term of this patent is extended or adjusted under 35 U.S.C. 154(b) by 505 days.

(21) Appl. No.: 17/028,935

(22) Filed: Sep. 22, 2020

(65) Prior Publication Data

US 2022/0060327 A1 Feb. 24, 2022

Related U.S. Application Data

(60) Provisional application No. 63/068,237, filed on Aug. 20, 2020.

(51) Int. Cl.
*G06F 30/20* (2020.01)
*H04L 9/32* (2006.01)

(52) U.S. Cl.
CPC ............... *H04L 9/32* (2013.01); *G06F 30/20* (2020.01)

(58) Field of Classification Search
CPC ........... H04L 9/32; G06F 30/20; G06F 30/367
See application file for complete search history.

(56) References Cited

U.S. PATENT DOCUMENTS 11,301,608 B2  4/2022  Lin

FOREIGN PATENT DOCUMENTS

JP    2009-252754    * 10/2009

OTHER PUBLICATIONS

Andrikos et al. Location, Location, Location: Revisiting Modeling and Exploitation for Location-Based Side Channel Leakages International Association for Cryptologic Research, Feb. 2019 (Year: 2019).*

(Continued)

*Primary Examiner* — Rehana Perveen
*Assistant Examiner* — Cuong V Luu
(74) *Attorney, Agent, or Firm* — Womble Bond Dickinson (US) LLP

(57) ABSTRACT

Methods, machine readable media and systems for near-field electromagnetic simulation for side-channel emission analysis of an integrated circuit (IC) are described. In one embodiment, a method can include the following operations: simulating EM field strengths for a plurality of grid partitions of a circuit area of the IC based on a cryptographic work load applied to a model of the IC; identifying one or more of the grid partitions as a security sensitive region for the IC based on the EM field strengths, wherein one or more grid partitions outside of the security sensitive region are identified as non-security sensitive regions for the IC; and simulating EM fields for the IC to perform the EM side-channel emission analysis, wherein contributions of the EM fields from the non-security sensitive regions for the EM side-channel emission analysis are based on a linear superposition of wire currents in the non-security sensitive regions of the IC.

14 Claims, 6 Drawing Sheets

(56) References Cited

OTHER PUBLICATIONS

Ametani et al. Guide for Numerical Electromagnetic Analysis Methods: Application to Surge Phenomena and Comparison With Circuit Theory-Based Approach Cigré 2013 (Year: 2013).*

Das et al. Stellar: A Generic EM Side-Channel Attack Protection through Ground-Up Root Cause Analysis IEEE 2019 (Year: 2019).*

* cited by examiner

SYSTEMS AND METHODS FOR A FAST NEAR-FIELD ELECTROMAGNETIC SIMULATION METHODOLOGY FOR SIDE-CHANNEL EMISSION ANALYSIS

This application claims priority to and the benefit of U.S. provisional patent application No. 63/068,237, filed Aug. 20, 2020, the US provisional patent application being hereby incorporated herein by reference.

BACKGROUND

Side channel attacks on a device, such as a smart phone or credit card or computer, can non-invasively extract sensitive information, such as cryptographic keys or passwords, from the device. There has been a proliferation of such attacks that exploit unintentional leakage through the "side channel" information which includes information derived from power supply noise (e.g., on a power grid of an IC), power consumption, electromagnetic emission, and thermal emission. For example by measuring the dynamic voltage drop or current draw of a device while performing a large number of encryption/decryption operations, the sensitive information of the device can be learned and extracted through statistical correlation analysis.

In particular, side-channel attacks can extract secret information from a running chip by exploiting physical emissions such as power noise and electromagnetic (EM) radiation. Near-field EM side-channel emission analysis (SCeA) is typically conducted by an EM probe near the surface of a targeted chip with the package removed to sense top metal-layer(s) signals.

To model such near-field EM emissions, simulation of dynamic current for all wire segments on top metal layer(s) needs to be performed. However, this is very difficult because of the vast number of wires on a chip (e.g., easily more than 100 Million wires on a chip). It would be useful to model such near-field EM emissions by EM side-channel emission analysis during IC simulation to identify IC areas where sensitive information could be non-invasively extracted in an efficient manner. Based upon this, the IC could potentially be re-designed before fabrication.

SUMMARY

In one embodiment, a non-transitory machine readable medium storing executable program instructions which when executed by a data processing system cause the data processing system to perform a method for near-field electromagnetic simulation for side-channel emission analysis of an integrated circuit (IC), is disclosed. The method includes the following operations: simulating EM field strengths for a plurality of grid partitions of a circuit area of the IC based on a cryptographic work load applied to a model of the IC; identifying one or more of the grid partitions as a security sensitive region for the IC based on the EM field strengths, wherein one or more grid partitions outside of the security sensitive region are identified as non-security sensitive regions for the IC; and simulating EM fields for the IC to perform the EM side-channel emission analysis, wherein contributions of the EM fields from the non-security sensitive regions for the EM side-channel emission analysis are based on a linear superposition of wire currents in the non-security sensitive regions of the IC.

In one embodiment, the security sensitive region is identified based upon a respective EM field strength for each of the one more grid partitions exceeding a pre-defined threshold. In one embodiment, the method further includes performing an EM field transient waveform calculation of the security sensitive region of the IC based upon a time-domain algorithm under a realistic cryptographic work load. In one embodiment, the chunked data are cycled in different cycles according to the time domain algorithm. In one embodiment, the time-domain algorithm for the EM field transient waveform calculation is used for circuit level abstraction flow. In one embodiment, the time-domain algorithm for the EM field transient waveform calculation is used for simulating and testing a design of the IC to evaluate if secret data is discoverable. In one embodiment, the time-domain algorithm for the EM field transient waveform calculation is used for simulating and testing a design of the IC to evaluate if secret data is discoverable before the IC is fabricated.

In one embodiment, a machine implemented method for near-field electromagnetic simulation for side-channel emission analysis of an integrated circuit (IC), is disclosed. The method includes the following operations: simulating EM field strengths for a plurality of grid partitions of a circuit area of the IC based on a cryptographic work load applied to a model of the IC; identifying one or more of the grid partitions as a security sensitive region for the IC based on the EM field strengths, wherein one or more grid partitions outside of the security sensitive region are identified as non-security sensitive regions for the IC; and simulating EM fields for the IC to perform the EM side-channel emission analysis, wherein contributions of the EM fields from the non-security sensitive regions for the EM side-channel emission analysis are based on a linear superposition of wire currents in the non-security sensitive regions of the IC.

In one embodiment, the security sensitive region is identified based upon a respective EM field strength for each of the one more grid partitions exceeding a pre-defined threshold. In one embodiment, the method further includes performing an EM field transient waveform calculation of the security sensitive region of the IC based upon a time-domain algorithm under a realistic cryptographic work load. In one embodiment, chunked data are cycled in different cycles according to the time domain algorithm. In one embodiment, the time-domain algorithm for the EM field transient waveform calculation is used for circuit level abstraction flow. In one embodiment, the time-domain algorithm for the EM field transient waveform calculation is used for simulating and testing a design of the IC to evaluate if secret data is discoverable. In one embodiment, the time-domain algorithm for the EM field transient waveform calculation is used for simulating and testing a design of the IC to evaluate if secret data is discoverable before the IC is fabricated.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
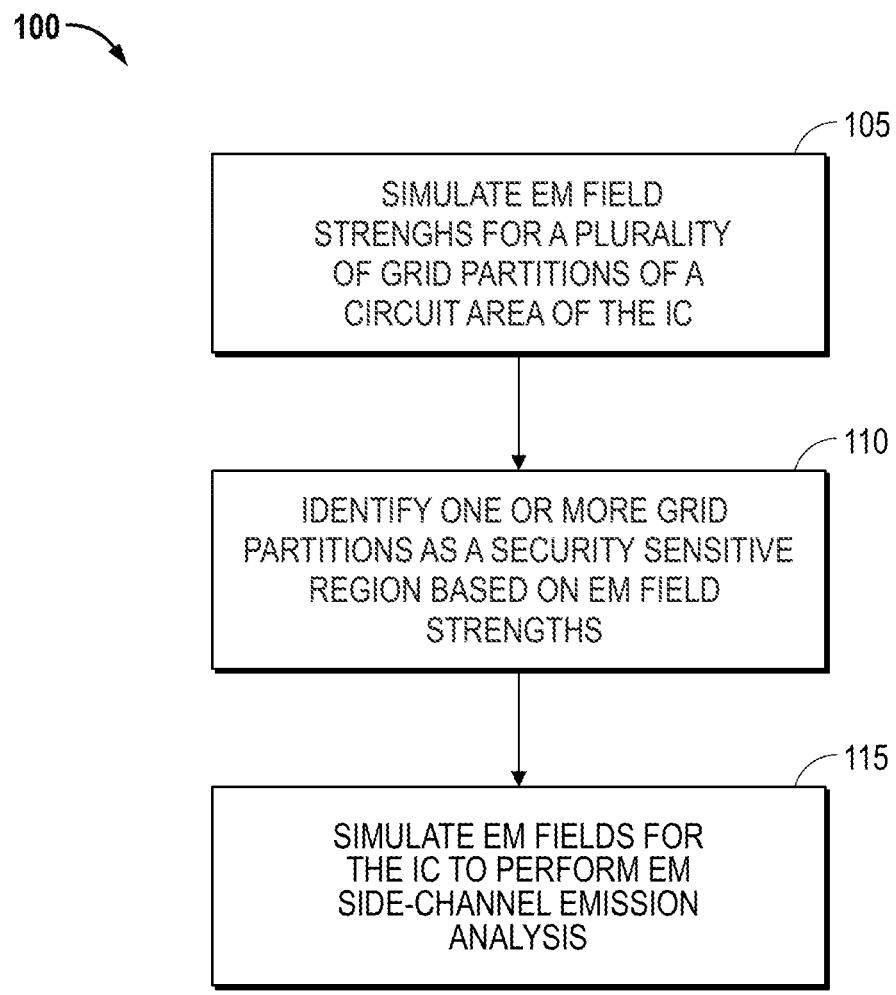
FIG. 1 shows a flow chart that depicts a method that can be used in one embodiment described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Embodiments described herein relate to systems and methods for fast near-field electromagnetic simulation methodology for side-channel emission analysis.

In one embodiment, an electromagnetic (EM) security sensitive observer is implemented in a hierarchically reduced ordering method for circuit simplification in chip power model generation and electromagnetic-dominated wire current distribution analysis. This provides a fast method for System-on-Chip (SoC) simplification during chip power model generation. Further, a unique region based algorithm may be used to handle the nonlinear EM decay for EM dominant wires simplification without loss of accuracy. Also, a time domain partition algorithm for fast EM field transient waveform calculation based on Biot-Savart law on top of the chip with package removed may be used.

The embodiments described herein can provide techniques for simulating and testing a design for sensitive data leakage before the design is fabricated and can do so with methods that reduce usage of computational resources thereby improving the computer technology used to do these simulations. These embodiments can allow the simulation to be used to cause a specific redesign based upon the simulation so that the redesign is informed by the simulation in ways that reduce the leakage of sensitive data (such as cryptographic keys or other data or passwords, etc.). The embodiments described herein can be used in simulations of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords and other cryptographic data and sensitive data, in a device.

Figure 2:
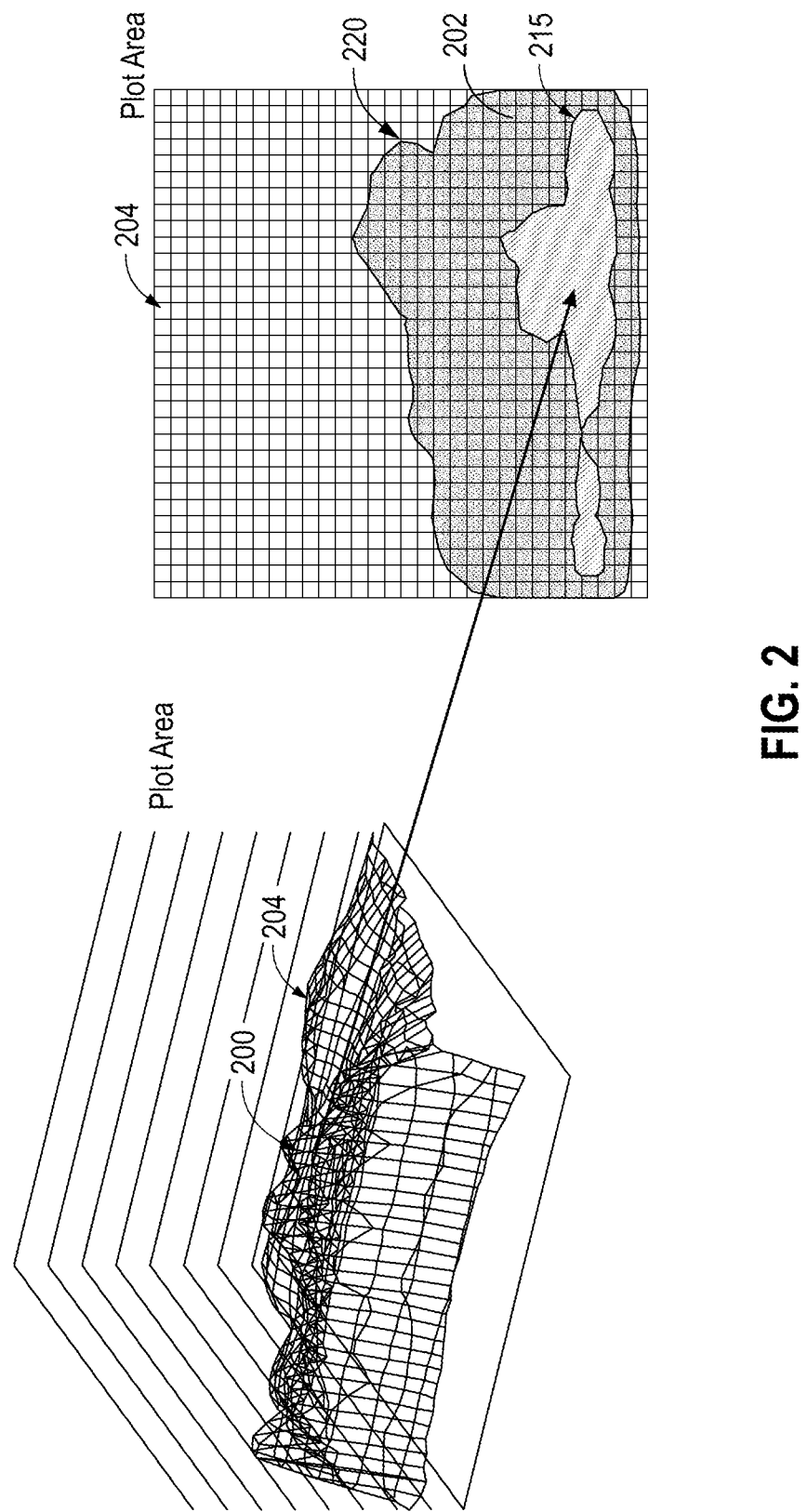
FIG. 2 is a diagram that shows EM field strengths that are simulated for a plurality of grid partitions according to one embodiment.

With reference to FIGS. 1 and 2, embodiments will be described. In one embodiment, a machine implemented method for near-field electromagnetic simulation for side-channel emission analysis of an integrated circuit (IC), is disclosed. The method 100 includes a first operation 105, in which, EM field strengths 200 are simulated for a plurality of grid partitions 202 of a circuit area 204 of the IC based on a cryptographic work load applied to a model of the IC. Further, in operation 110, one or more of the grid partitions 202 are identified as a security sensitive region 215 for the IC based on the EM field strengths, wherein grid partitions outside of the security sensitive region 215 are identified as non-security sensitive regions 220 for the IC. As can be seen in FIG. 2, there is an identified security sensitive region 215 and an identified non-security sensitive region 220. Furthermore, in operation 115, the EM fields for the IC are simulated to perform EM side-channel emission analysis based upon the EM fields from the security sensitive region 215 and the non-security sensitive region 220, in which, contributions of the EM fields from the non-security sensitive regions for the EM side-channel emission analysis are based on a linear superposition of wire currents in the non-security sensitive regions of the IC, as will be described.

In one embodiment, the security sensitive region 215 is identified based upon the EM field strength 200 calculated by the Biot-Savart law for each of the grid partitions 202 exceeding a pre-defined threshold.

As has been described, side-channel leakage is unintentional information leakage from the physical implementation weakness of a crypto-device, which highly impairs the mathematic proof of any crypto-algorithms. Side-channel leakage can be carried by device power consumption, power-noise emission, electromagnetic (EM) emission, thermal emission, etc. Various techniques have been described to identify power-noise emission from a chip layout database and implement a novel pre-screen method to rank power-noise side-channel leakage and wire current leakage with a leakage score at every on-chip virtual probe. One such implementation is described in U.S. patent application Ser. No. 16/948,158, and U.S. provisional patent application No. 62/704,945, both hereby incorporated by reference. For example, a metric referred to as a side channel leakage score (SLS) can be defined as the ratio of (a) the correlation coefficient of the correct key to (b) the maximum correlation coefficient of the guessed key among all possible key values.

Wire current strength can reflect the EM strength in a preliminary way, since near-field EM is stimulated by wire current. The highest EM radiation is collocated with the wire with highest current. Below is the equation about such relation according to the Biot-Savart law:

$$B(t) = \frac{\mu_0}{4\pi} I_{(t)} \int_C \frac{d\ell \times r'}{|r'|^3} \qquad (1)$$

From the above equation, regional pieces of metal wires belong to the on-chip power grid network (e.g., grid partitions 202 of circuit area 204 of the IC) and are considered as small electrical dipoles with I(t), and B(t) of a plane parallel to the chip surface, which is generated by summing current contribution of all dipoles. The r' represents the vector from the dipole point to the EM probe point, and l represents the point on the dipole wire.

The challenge of simulation of EM leakage is to enable fast time-domain simulation with a reasonable amount of runtime and accuracy. Thousands of cycles of time-domain EM leakage simulation may be required for side-channel analysis. Embodiments described herein relate to a reduced ordering method with time-domain partitioning mathematical analysis.

As can be seen in FIG. 2, as an example, an EM sensitive observer generation box may be used in the description of how an EM security sensitive region 215 is identified to generate EM leakage with a small amount of time-domain simulation (e.g., only 100 cycles only (as opposed to a 1000 cycles)). Firstly, an EM security sensitive observer may be defined by specific X-Y pitches or number of regions, in which each observer occupies a rectangle zone of the on-chip power grid of the circuit area 204 of the IC. As a particular example, for this description, a grid partition 202 may be defined. Therefore, in this example, the chip power grid network may be partitioned into X observers (e.g., grid partitions 202). Each grid partition square or rectangle 202 (e.g., can be a 1 um by 1 um area) may be considered a "mesh partition", and it may have one wire current associated with it and an electric dipole. Therefore, the EM security sensitive region 215 may be composed of large quantity of grid partitions 202 and dipoles. The wires in the EM security sensitive region may be denoted as EM dominant wires.

As has been described, each grid partition 202 may contain a set of wire current I(t), and B(t) that can be derived from current based on the Biot-Savart equation (1), described above. As an example, a highest observer point is picked upon a threshold either by absolute EM field strength value or a rank of values. The EM field strength may be calculated based on a typical crypto-working scenario (e.g., a cryptographic work load of 100 cycles). Also, overlapping between high field strength and high on-chip power-noise leakage scoring regions may be used to identify the EM security sensitive region. Therefore, figure-of-merit indicators to identify the EM security sensitive region 215 are utilized to minimize the amount of work-load required for simulation processing. In particular, as has been described, the EM security sensitive region 215 is particularly identified based upon the EM field strength 200 calculated by the Biot-Savart law for each of the grid partitions 202 exceeding a pre-defined threshold. The pre-defined threshold may be set by a user based upon magnetic detector sensitivity, user specified percentage of peak EM strength, as well as other factors identified by the user.

As an example embodiment implementation to define the EM security sensitive region 215 based the upon the grid partitions 202 of the IC, first, the layout (DEF or GDS or OASIS file) of the circuit area 204 of the chip may be read. Next, an extraction of the power and ground grid to build the on-chip power distribution network (PDN) model may be performed. The PDN model may be uniformly partition small mesh grid partitions 202 (e.g., 1 um by 1 um). As an example, there may 10000 mesh partitions. This can be general to a tool program. Next, a representative cryptographic work load may be used to excite the PDN. As a physical example, the on-chip PDN needs to deliver power to the gates operating under 10 s cycles of security workload. Based on this example, every partition may get a current I(t). In particular, 10000 of such I(t) segments will induce near-field EMag on top of the surface of the layout. Based upon this, the tool program may calculate EM field strength by the Biot-Savart equation. Based upon this, as an example, approximately 200 grid partitions 202 may observe a high EM strength over a threshold set by a user. These 200 grid partition 202 may be selected as the EM security sensitive region 215. This provides a unique spatial reduction method. It should be appreciated this region may be denoted as an "EM security sensitive region", "EM sensitive region", "security-aware EM sensitive regions", etc. In particular, the EM security sensitive region 215 includes EM dominant wires whereas the non-security sensitive region 220 includes EM non-dominant wires. It should be appreciated that "a cryptographic work load" may correspond to simulating a sequence of hardware operations to finish an encryption or decryption function. For example, for an AES cryptographic system, a plaintext is encrypted with a secret key based on an encryption function by the hardware to generate a ciphertext. The ciphertext is used in all communications between components (memory, CPU, IO), so that no plaintext is seen in untrusted location to leak out. A typical or representative cryptographic work load may be simulated within a few simulation cycles (e.g. about 10). A realistic cryptographic work load may require much more simulation cycles (e.g. thousands) than a representative cryptographic work load does. Therefore, as a comparison of a representative cryptographic workload vs. a realistic cryptographic workload: the representative cryptographic workload may be a few 100 s cycles, while the realistic cryptographic workload may be millions of cycles. The representative cryptographic workload may be used for "security sensitive region identification" and the realistic cryptographic workload may be used for final EM SCeA to decide the efforts to disclose the secret information completely.

As will be described, after the EM security sensitive region 215 and non-security sensitive regions 220 have been identified, detailed further model reduction of the EM security sensitive region 215 can be performed at the chip level and system level for EM leakage analysis.

Figure 3:
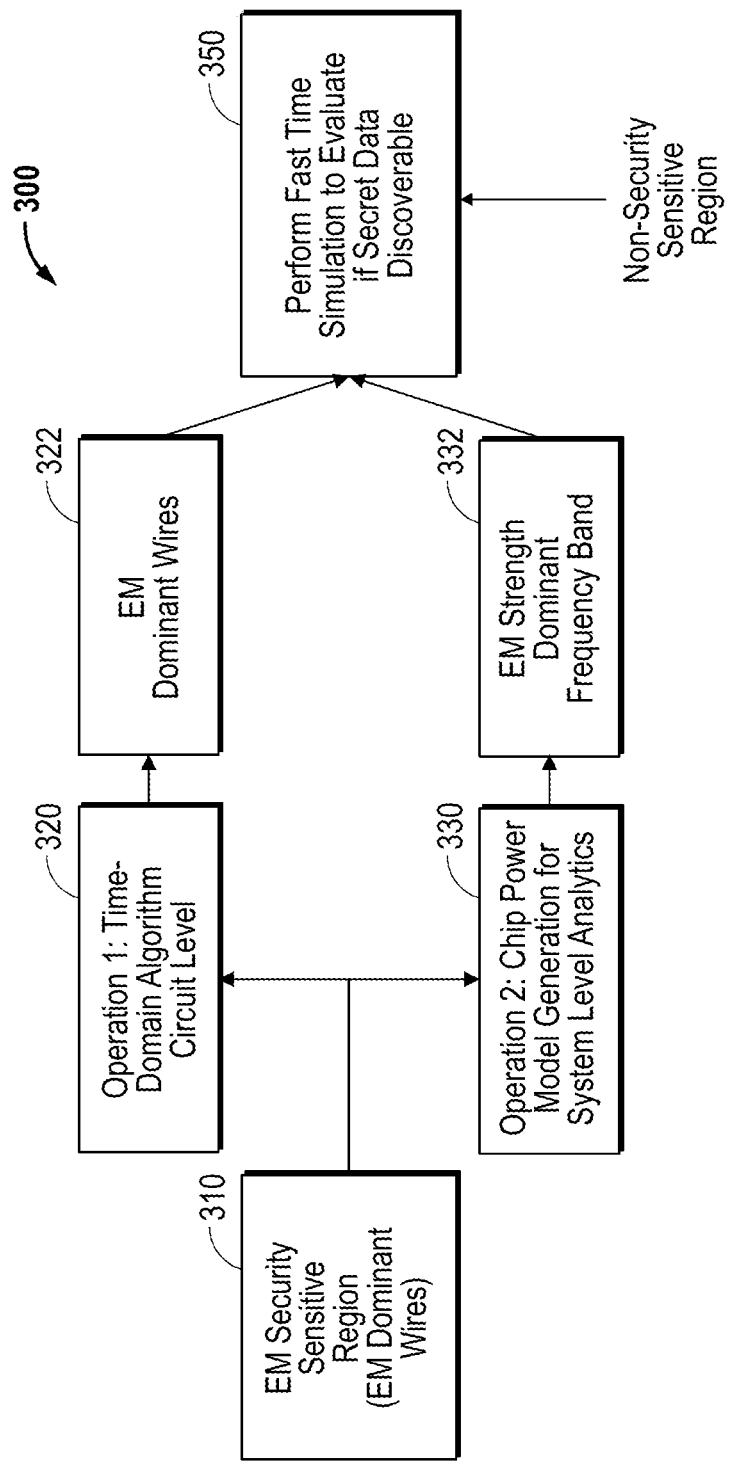
FIG. 3 is a flow chart that shows a method according to one embodiment.

With additional reference to FIG. 3, two operations may be implemented based upon the EM security sensitive region including EM dominant wires to perform simulation for EM side-channel emission analysis. In the first operation, a time-domain algorithm for an EM field transient waveform calculation of the security sensitive region of the IC is performed based upon a cryptographic work load. The time-domain algorithm for the EM field transient waveform calculation is used for circuit level abstraction flow. The time-domain algorithm for the EM field transient waveform calculation is used for simulating and testing a design of the IC to evaluate if secret data is discoverable (e.g., before the IC is fabricated). Also, a frequency band aware model order reduction (MOR) for total demand on the IC and package may be performed based upon a cryptographic work load. Therefore, two operations are implemented.

At block 310, the EM security sensitive region 215 is obtained that includes the EM dominant wires. Next, at block 320, in the first operation, circuit level abstraction flow occurs at the circuit level to implement a time-domain algorithm. In the first operation, a time-domain algorithm for an EM field transient waveform calculation of the security sensitive region of the IC based on the set of EM of dominant wires 322 is performed based upon a cryptographic work load. In particular, for the EM security sensitive region 215, a realistic cryptographic workload is applied to the EM dominant wires (e.g., thousands of cycles). In this way, an EM strength map for the EM security sensitive region 215 including all of the grid partitions 202 is obtained. The distribution details are obtained by the Biot-Savart law. As an example, to do EMag side-channel emission analysis, the cryptographic work load is applied (thousands of cycles) to stimulate the PDN again. Based upon this, an EM strength map for the EM security sensitive region 215 including all of the grid partitions 202 is obtained.

Therefore, in the first operation, at the circuit level, an EM field transient waveform calculation for EM side-channel analysis is made based upon a time-domain algorithm only for the EM security sensitive region 215 (for only the set of EM of dominant wires 322) based upon a cryptographic work load. Because only the EM security sensitive region 215 and EM dominant wires are used and not the rest of the non-security sensitive region 220 (and non-dominant wires) only thousands of wires/cycles are implemented and not hundreds of millions as would be required in conventional implementations and implementation speeds may be 10 to 100 times faster. Based upon the EM side-channel emission analysis from the circuit level time-domain analysis for simulating and testing a design of the IC, the analysis may be evaluated to determine if secret data is discoverable 350, which may also be combined with further analysis to be described.

Also, to enhance the EM side-channel emission analysis from the circuit level time-domain analysis for simulating and testing a design of the IC to determine if secret data is discoverable 350, aspects of the non-security sensitive region 220 (and non-dominant wires) may also be taken into consideration based on a linear supposition of wire currents in the non-sensitive region 220. The non-sensitive region 220 may be represented by simply using the equation below as current contribution to the near-field EM calculation:

$$I_{densitiy\_non_{sentivie}\_partition} = \frac{\sum I_k l_k}{l}$$

Therefore, the current contribution to the near-field EM calculation would be based upon the above-equation: where l is the dimension of the partition bounding box along the current direction; where $l_k$ is each wire in that partition; where $I_k$ is average current or I(t) on that wire (with direction), and the contribution of all wires is just the sum of $I_k l_k$. Further, the Biot-Savart equation is applied for I density and l. Also, it should be appreciated that for the non-security sensitive region other simplification methods such as: reduced order models, aggressive average current/cap density methods, etc., may be used.

With brief reference to FIG. 4, the processing speed for the time domain algorithm 320 for EM emission calculation can be increased by cycling chunked data in different cycles, as will be described. A bottleneck for time-domain partition simulations are: 1) Operating point is very important for system responses, in normal power/ground (P/G) dynamic voltage drop simulation and a large halo region is needed for time domain partition; and 2) In distributed computational platforms such as Redhawk-SC platform (commercial IR drop tool), it's able to do unlimited workers for millions of cycle simulation, however, the matrix factorization overhead is huge. Therefore, an improvement can be made to the previously described time domain algorithm 320 for EM emission calculation by the reuse of a refactored matrix for each chunked time frame. Furthermore, due to the nature of Differential Power Analysis/Correlation Power Analysis (DPA/CPA) analysis, the dynamic voltage drop due to operating shift is cancelled out for correlated signals, and the halo region overhead is negligible.

Figure 4:
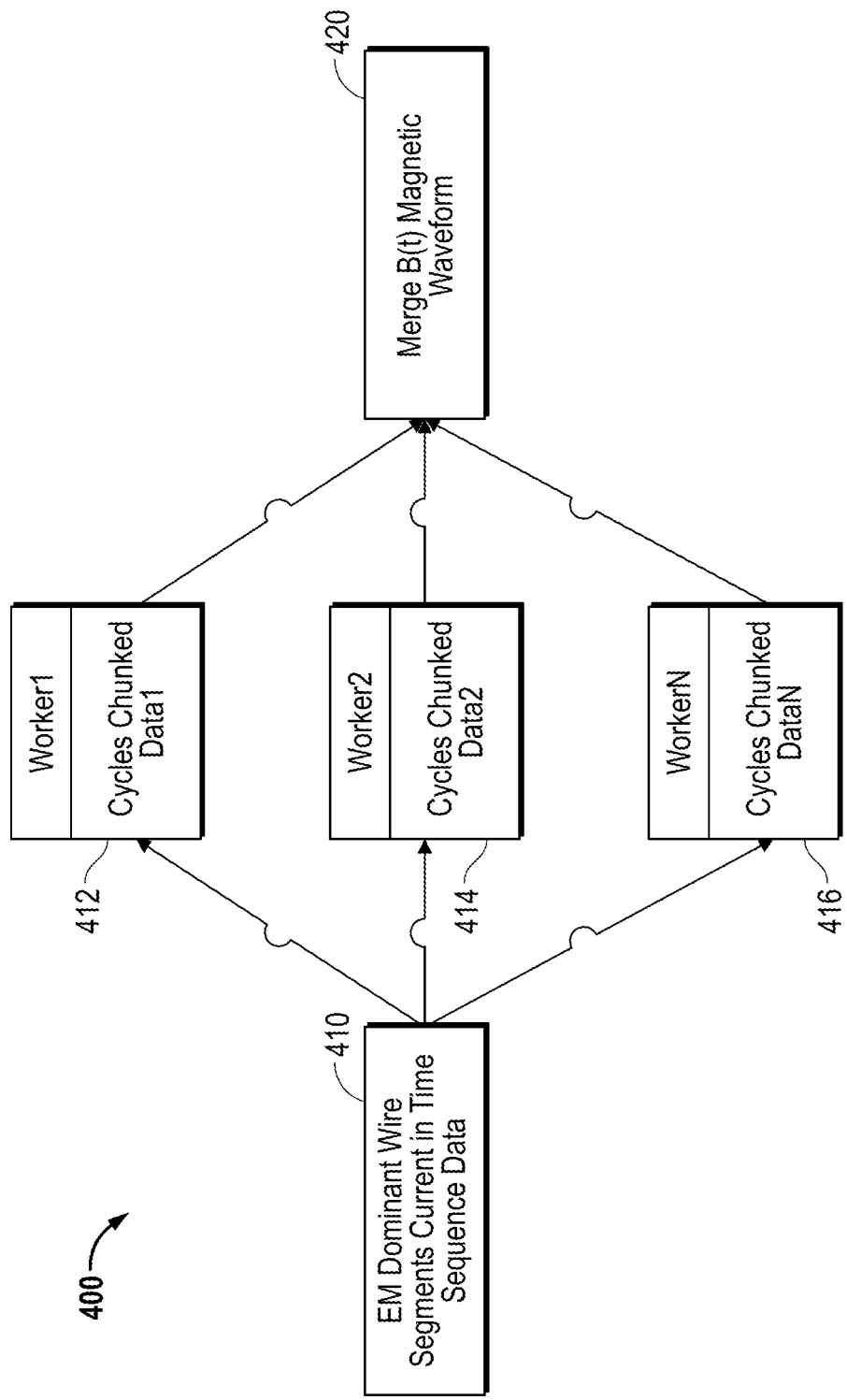
FIG. 4 is flow chart that shows an example of a method to increase processing speed in a time domain algorithm for EM emission calculation according to one embodiment.

As an example, as shown in FIG. 4 in process 400, EM dominant wire segments current in time sequence data (block 410) are sent in parallel to workers1, workers2 ... workerN to process chunked data cycles 1, 2 ... N (412, 414, 416) which are then merged together in the Biot-Savart (B(t)) magnetic waveform equation. A worker may be defined as a computer CPU, such that, a computer processor may have 32 CPUs in it. By utilizing this implementation, this procedure can grep 32 workers in parallel to run the simulation.

In this way, for thousands and millions of cycles of B(t) computation, as shown in FIG. 4, data may be partitioned into different cycles of chunked data simultaneously by workers1 ... N and merged into the B(t) magnetic waveform equation. The below equation may be used with the Figure, with deltaJ(t)/dt and J(t); where J(t) denotes the current on the wire:

$$\vec{H}(\vec{r}, t) = \nabla \times \int \int_S \frac{\vec{J}(\vec{r}', t - R/c)}{4\pi R} ds'$$

$$= \frac{1}{4\pi} \int \int_S \hat{R} \times \left[ \frac{1}{cR} \frac{\partial \vec{J}(\vec{r}', t')}{\partial t'} + \frac{\vec{J}(\vec{r}', t')}{R^2} \right]_{t'=t-\frac{R}{c}} ds'$$

With reference again to FIG. 3, as previously described, a second operation may also be performed. In the second operation: Chip power model generation for system level analytics is performed. For this implementation, an EM strength (frequency band) aware model order reduction (MOR) for total demand on the IC and package may be performed based upon the cryptographic work load. In this implementation, not only the chip but also the package and board model are considered to simulate system-level EM side-channel emission. Therefore, in one embodiment, a frequency band aware model order reduction (MOR) is performed to post-process the EM field generated from the realistic cryptographic work load.

At block 310, the EM security sensitive region 215 is obtained that includes the EM dominant wires. At block 330, in the second operation, chip power model generation for system level EM analytics is performed. At block 332, EM strength dominant (frequency band) aware model order reduction (MOR) for total demand on the IC and package may be performed based upon the cryptographic work load.

Figure 5:
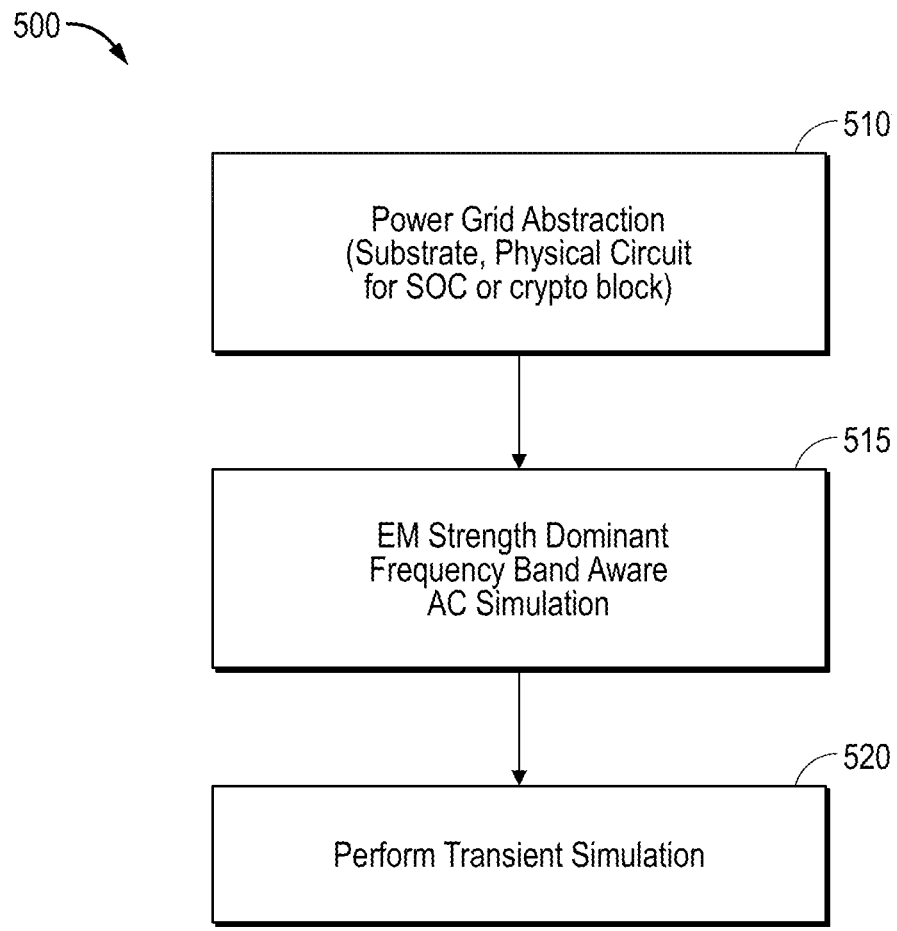
FIG. 5 is flow chart that shows an example of a method for an EM strength dominant (frequency band) aware model according to one embodiment.

With brief additional reference to FIG. 5, at block 510, power grid extraction is performed. Power grid extraction is performed for the whole IC and package—including the substrate, physical circuit for the system-on-chip (SoC) and including crypto-blocks. At block 515, EM strength dominant frequency band aware AC simulation is performed. At block 520, transient simulation is performed (e.g., SPICE). It should be noted that because the EM security sensitive region 215 and the cryptographic workload are known that the frequency band can be targeted. In this way, with a targeted frequency band, the AC simulation is very accurate, efficient, and fast. In particular, the AC simulation based upon an EM strength dominant frequency band aware model provides a very accurate, efficient, and fast model for the total demand on the IC and package.

With reference again to FIG. 3, at block 350, fast time simulation is performed to evaluate if secret data is discoverable based upon the near-field EM simulation for side-channel emission analysis previously described including: the time-domain algorithm for the EM field transient waveform calculation used for circuit level abstraction flow; and/or EM strength dominant (frequency band) aware model order reduction (MOR) for total demand on the IC and package; and/or the non-security sensitive region input. As has been described, the time-domain algorithm for the EM field transient waveform calculation is used for simulating and testing a design of the IC to evaluate if secret data is discoverable (e.g., before the IC is fabricated). Similarly, the EM strength dominant (frequency band) aware model input and/or the non-security sensitive region input may be used in collaboration with the time domain EM field transient waveform calculation for simulating and testing a design of the IC to evaluate if secret data is discoverable (e.g., before the IC is fabricated). As has been described, if secret data is discoverable, the IC may be redesigned before fabrication to address secret data discoverability.

These simulations can use the aspects and embodiments described herein. The user or designer can evaluate the results of one or more simulations to determine whether the design of the IC satisfies certain desired criteria for the design. For example, a user or designer can determine whether it is too easy to detect secret data (e.g., keys, sensitive data, etc.) in the device from current results. If one or more criteria is satisfied, then the user or designer may provide data about the circuit to allow for the fabrication or manufacture of the IC or system or not allow for the fabrication or manufacture of the IC or system and provide changes. For example, if the one or more criteria is satisfied, one or more CAD files can be produced that describe how to build the IC or system. If the criteria are not satisfied, the designer can revise the design (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to secret data (such as cryptographic keys) by using techniques that improve the speed of simulations and reduce the computational complexity of the simulations, thereby improving the operation of a data processing system (e.g., a computer) performing the simulations and other operations. Moreover, these techniques provide more accurate results more quickly, efficiently, and at less cost. It will be understood that secret data or sensitive data can be in various different forms or types, including, for example, passwords, account numbers, account names, hashes, keys of various different types (files keys, device keys), device identifiers, etc.

Figure 6:
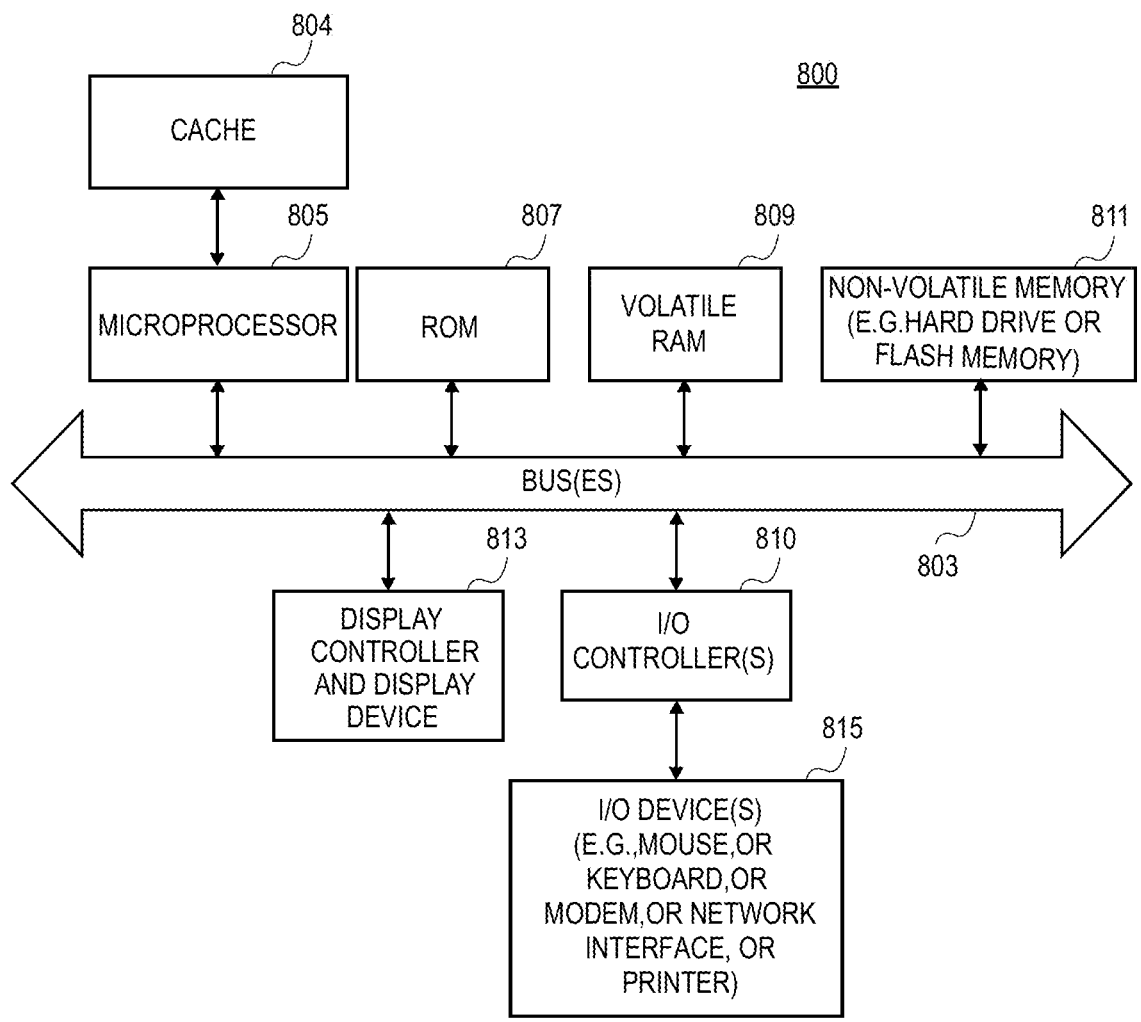
FIG. 6 shows an example of a data processing system that can be used to implement one or more embodiments described herein.

FIG. 6 shows one example of a data processing system 800, which may be used with one embodiment. For example, the system 800 may be implemented to provide a computer system or device that performs any one of the methods shown (e.g., FIGS. 1-5) or described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method for near-field electromagnetic simulation for side-channel emission analysis of an integrated circuit (IC), the method comprising:
   simulating EM field strengths for a plurality of grid partitions of a circuit area of the IC based on a cryptographic work load applied to a model of the IC;
   identifying one or more of the grid partitions as a security sensitive region for the IC based on the EM field strengths, wherein one or more grid partitions outside of the security sensitive region are identified as non-security sensitive regions for the IC; and
   simulating EM fields for the IC to perform the EM side-channel emission analysis, wherein contributions of the EM fields from the non-security sensitive regions for the EM side-channel emission analysis are based on a linear superposition of wire currents in the non-security sensitive regions of the IC, wherein, an EM field transient waveform calculation is performed for simulating EM fields of the identified security sensitive region of the IC under the cryptographic work load.

2. The medium as in claim 1, wherein the security sensitive region is identified based upon a respective EM field strength for each of the one more grid partitions exceeding a pre-defined threshold.

3. The medium as in claim 2, wherein the EM field transient waveform calculation of the security sensitive region of the IC is based upon a time domain algorithm under a realistic cryptographic work load.

4. The medium as in claim 3, wherein chunked data are cycled in different cycles according to the time domain algorithm.

5. The medium as in claim 3, wherein the time-domain algorithm for the EM field transient waveform calculation is used for circuit level abstraction flow.

6. The medium as in claim 3, wherein the time-domain algorithm for the EM field transient waveform calculation is used for simulating and testing a design of the IC to evaluate if secret data is discoverable.

7. The medium as in claim 6, wherein the time-domain algorithm for the EM field transient waveform calculation is used for the simulating and testing a design of the IC to evaluate if secret data is discoverable before the IC is fabricated.

8. A machine implemented method for near-field electromagnetic simulation for side-channel emission analysis of an integrated circuit (IC), the method comprising:

simulating EM field strengths for a plurality of grid partitions of a circuit area of the IC based on a cryptographic work load applied to a model of the IC;

identifying one or more of the grid partitions as a security sensitive region for the IC based on the EM field strengths, wherein one or more grid partitions outside of the security sensitive region are identified as non-security sensitive regions for the IC; and simulating EM fields for the IC to perform the EM side-channel emission analysis, wherein contributions of the EM fields from the non-security sensitive regions for the EM side-channel emission analysis are based on a linear superposition of wire currents in the non-security sensitive regions of the IC, wherein, an EM field transient waveform calculation is performed for simulating EM fields of the identified security sensitive region of the IC under the cryptographic work load.

9. The method as in claim 8, wherein the security sensitive region is identified based upon a respective EM field strength for each of the one more grid partitions exceeding a pre-defined threshold.

10. The method as in claim 9, wherein the EM field transient waveform calculation of the security sensitive region of the IC is based upon a time domain algorithm under a realistic cryptographic work load.

11. The method as in claim 10, wherein chunked data are cycled in different cycles according to the time domain algorithm.

12. The method as in claim 10, wherein the time-domain algorithm for the EM field transient waveform calculation is used for circuit level abstraction flow.

13. The method as in claim 10, wherein the time-domain algorithm for the EM field transient waveform calculation is used for simulating and testing a design of the IC to evaluate if secret data is discoverable.

14. The medium as in claim 13, wherein the time-domain algorithm for the EM field transient waveform calculation is used for the simulating and testing a design of the IC to evaluate if secret data is discoverable before the IC is fabricated.

\* \* \* \* \*